(12) United States Patent
Zhu

(10) Patent No.: US 11,372,289 B2
(45) Date of Patent: Jun. 28, 2022

(54) DISPLAY PANEL COMPRISING AT LEAST ONE BINDING ALIGNMENT BLOCK HAVING A THICKNESS GREATER THAN A THICKNESS OF EACH OF A PLURALITY OF BINDING PINS AND METHOD OF MANUFACTURING THE SAME

(71) Applicant: TCL CHINA STAR OPTOELECTRONICS TECHNOLOGY CO., LTD., Shenzhen (CN)

(72) Inventor: Qingyong Zhu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 316 days.

(21) Appl. No.: 16/617,192

(22) PCT Filed: Nov. 15, 2019

(86) PCT No.: PCT/CN2019/118622
§ 371 (c)(1),
(2) Date: Nov. 26, 2019

(87) PCT Pub. No.: WO2021/035984
PCT Pub. Date: Mar. 4, 2021

(65) Prior Publication Data
US 2021/0333605 A1 Oct. 28, 2021

(30) Foreign Application Priority Data
Aug. 27, 2019 (CN) .......................... 201910793714.5

(51) Int. Cl.
*G02F 1/1345* (2006.01)
*G02F 1/1333* (2006.01)

(52) U.S. Cl.
CPC ........ *G02F 1/13452* (2013.01); *G02F 1/1333* (2013.01); *G02F 1/13458* (2013.01)

(58) Field of Classification Search
CPC .......... G02F 1/136231; G02F 1/13625; G02F 1/13456
See application file for complete search history.

(56) References Cited

U.S. PATENT DOCUMENTS

2009/0316080 A1* 12/2009 Uehara ............. G02F 1/133351
349/187
2010/0253900 A1* 10/2010 Uehara .................. H05K 3/361
349/152
(Continued)

FOREIGN PATENT DOCUMENTS

| CN | 103943651 A | 7/2014 |
| CN | 107505785 A | 12/2017 |

(Continued)

*Primary Examiner* — Paul C Lee
(74) *Attorney, Agent, or Firm* — Benesch, Friedlander, Coplan & Aronoff LLP

(57) ABSTRACT

A display panel, a method of manufacturing the same, and a display device are provided. The display panel includes a first substrate, a plurality of binding pins, and at least one binding alignment block. The first substrate includes a non-display area. The binding pins are disposed on the first substrate. An end of each of the binding pins extends to an edge of a binding side of the first substrate and is disposed on the non-display area. The at least one binding alignment block is disposed on the non-display area. A side of the at least one binding alignment block is in a same plane as the binding side of the first substrate, and a thickness of the at least one binding alignment block is greater than a thickness of each of the binding pins.

10 Claims, 3 Drawing Sheets

(56) References Cited

U.S. PATENT DOCUMENTS

| | | | |
|---|---|---|---|
| 2014/0146410 A1* | 5/2014 | Lo | G02F 1/133512 |
| | | | 359/891 |
| 2015/0060782 A1 | 3/2015 | Li et al. | |
| 2015/0378071 A1* | 12/2015 | Wang | G02B 5/201 |
| | | | 427/532 |
| 2017/0097542 A1* | 4/2017 | Byun | G02F 1/136286 |

FOREIGN PATENT DOCUMENTS

| | | |
|---|---|---|
| CN | 107544185 A | 1/2018 |
| CN | 110119054 A | 8/2019 |
| EP | 2237101 A1 | 10/2010 |
| JP | 2008158138 A | 7/2008 |

* cited by examiner

| Providing a first substrate including a display area and a non-display area disposed around the display area | — S61 |

| Forming a plurality of binding pins on the first substrate, and forming at least one binding alignment block on the non-display area, wherein an end of each of the binding pins extends to an edge of a binding side of the first substrate and is disposed on the non-display area, a side of the at least one binding alignment block is in a same plane as the binding side of the first substrate, and a thickness of the at least one binding alignment block is greater than a thickness of each of the binding pins | — S62 |

FIG. 6

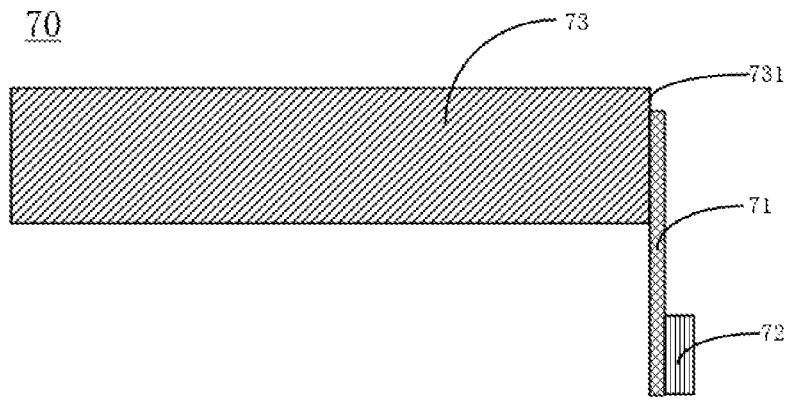

FIG. 7

DISPLAY PANEL COMPRISING AT LEAST ONE BINDING ALIGNMENT BLOCK HAVING A THICKNESS GREATER THAN A THICKNESS OF EACH OF A PLURALITY OF BINDING PINS AND METHOD OF MANUFACTURING THE SAME

FIELD OF INVENTION

The present disclosure relates to the field of display technologies, and more particularly to a display panel, a method of manufacturing the same, and a display device.

BACKGROUND OF INVENTION

Most of current liquid crystal display devices on the market are backlight type liquid crystal displays, which include a liquid crystal display panel and a backlight module. The working principle of the liquid crystal display panel is to place liquid crystal molecules in two parallel glass substrates. There are many vertical and horizontal small wires between the two glass substrates, and the liquid crystal molecules are controlled to change direction by energization or not, and light of the backlight module is refracted to produce an image.

Voltage and control signals required for pixel driving of the liquid crystal display panel are derived from an external driving circuit board. The voltage and control signals are transmitted from the external driving circuit board to the liquid crystal display panel through a chip on film (COF). Current COF binding methods are to form a plurality of binding pins on an upper surface of an array substrate, and bind a COF to the binding pins. However, this binding structure binds the COF to the upper surface of the array substrate, and needs to occupy a frame area of the display panel, which does not conform to a development trend of current narrow bezel display panels.

Therefore, the prior art proposes a side binding technology to reduce a width of a border of a display panel by binding a COF to a side of an array substrate. However, a thickness of a side section of each binding pin is only about 0.5 μm, the side binding technology requires extremely high recognition and reading accuracy of a binding device, thereby increasing the difficulty of binding and seriously reducing binding efficiency.

SUMMARY OF INVENTION

An object of the present application is to provide a display panel, a method of manufacturing the same, and a display device, so as to reduce the difficulty of side binding and improve efficiency of the side binding.

In order to solve the above issues, an embodiment of the present application provides a display panel. The display panel includes a first substrate comprising a display area and a non-display area disposed around the display area, a plurality of binding pins disposed on the first substrate, and at least one binding alignment block disposed on the non-display area. An end of each of the binding pins extends to an edge of a binding side of the first substrate and is disposed on the non-display area. A side of the at least one binding alignment block is in a same plane as the binding side of the first substrate, and a thickness of the at least one binding alignment block is greater than a thickness of each of the binding pins.

In an embodiment of the present application, a ratio of the thickness of the at least one binding alignment block to the thickness of each of the binding pins ranges from 5 to 20.

In an embodiment of the present application, a contact width of the at least one binding alignment block and the edge of the binding side of the first substrate ranges from 100 to 300 micrometers.

In an embodiment of the present application, the at least one binding alignment block is equally spaced along the edge of the binding side of the first substrate.

In an embodiment of the present application, at least one of the binding pins is disposed between two adjacent binding alignment blocks.

In an embodiment of the present application, the at least one binding alignment block comprises a first primary color resist layer, a second primary color resist layer, and a third primary color resist layer sequentially away from the first substrate.

In an embodiment of the present application, material of the at least one binding alignment block comprises a black shading material.

In an embodiment of the present application, the display panel according further comprises a liquid crystal layer and a second substrate, the liquid crystal layer is disposed on the first substrate on which the binding pins and the at least one binding alignment block are disposed, and the second substrate is disposed on the liquid crystal layer.

In order to solve the above issues, an embodiment of the present application provides a method of manufacturing a display panel comprising: providing a first substrate comprising a display area and a non-display area disposed around the display area, forming a plurality of binding pins on the first substrate, and forming at least one binding alignment block on the non-display area. An end of each of the binding pins extends to an edge of a binding side of the first substrate and is disposed on the non-display area, a side of the at least one binding alignment block is in a same plane as the binding side of the first substrate, and a thickness of the at least one binding alignment block is greater than a thickness of each of the binding pins.

In an embodiment of the present application, the at least one binding alignment block comprises a first primary color resist layer, a second primary color resist layer, and a third primary color resist layer sequentially away from the first substrate, and forming the at least one binding alignment block on the non-display area comprises: forming the first primary color resist layer on the non-display area using a first mask, forming the second primary color resist layer on the first primary color resist layer using a second mask, and forming the third primary color resist layer on the second primary color resist layer using a third mask.

In order to solve the above issues, an embodiment of the present application provides a display device comprising a driving circuit, a flip chip, and a display panel. The flip chip is disposed on a binding side of the display panel and electrically connected to an end of each of a plurality of binding pins of the display panel, the driving circuit is electrically connected to the flip chip, and the display panel comprises: a first substrate comprising a display area and a non-display area disposed around the display area, the plurality of binding pins disposed on the first substrate, and a binding alignment block disposed on the non-display area. An end of each of the binding pins extends to an edge of a binding side of the first substrate and is disposed on the non-display area. A side of the binding alignment block is in a same plane as the binding side of the first substrate, and a thickness of the binding alignment block is greater than a thickness of each of the binding pins.

In an embodiment of the present application, a ratio of the thickness of the at least one binding alignment block to the thickness of each of the binding pins ranges from 5 to 20.

In an embodiment of the present application, a contact width of the at least one binding alignment block and the edge of the binding side of the first substrate ranges from 100 to 300 micrometers.

In an embodiment of the present application, the at least one binding alignment block is equally spaced along the edge of the binding side of the first substrate.

In an embodiment of the present application, at least one of the binding pins is disposed between two adjacent binding alignment blocks.

In an embodiment of the present application, the at least one binding alignment block comprises a first primary color resist layer, a second primary color resist layer, and a third primary color resist layer sequentially away from the first substrate.

In an embodiment of the present application, material of the at least one binding alignment block comprises a black shading material.

In an embodiment of the present application, the display panel further comprises a liquid crystal layer and a second substrate, the liquid crystal layer is disposed on the first substrate on which the binding pins and the at least one binding alignment block are disposed, and the second substrate is disposed on the liquid crystal layer.

Beneficial effects of an embodiment of the present application are that, the present application is different from the prior art. The display panel provided by an embodiment of the present application includes a first substrate, and at least one binding alignment block and a plurality of binding pins on the first substrate. The first substrate includes a display area and a non-display area disposed around the display area, an end of each of the binding pins extends to an edge of a binding side of the first substrate and is disposed on the non-display area, a side of the binding alignment block is in a same plane as the binding side of the first substrate, and a thickness of the binding alignment block is greater than a thickness of each of the binding pins, so that when a side binding is performed, a side section of each binding pin can be positioned and bound by the at least one binding alignment block. The thickness of the at least one binding alignment block is larger, and is more easily recognized and read by a binding device, thereby reducing difficulty of side binding and improving efficiency of the side binding.

DESCRIPTION OF DRAWINGS

In order to more clearly illustrate the technical solutions in the embodiments of the present application, the drawings used in the description of the embodiments will be briefly described below. It is obvious that the drawings in the following description are only some embodiments of the present application. Other drawings can also be obtained from those skilled in the art based on these drawings without paying any creative effort.

FIG. 6 is a schematic flowchart of a method of manufacturing a display panel according to an embodiment of the present application.

FIG. 7 is a schematic structural view of a display device according to an embodiment of the present application.

DETAILED DESCRIPTION OF PREFERRED EMBODIMENTS

The present application will be further described in detail below with reference to the accompanying drawings and embodiments. It is specifically noted that the following examples are merely illustrative of the present application, but are not intended to limit the scope of the application. In the same manner, the following embodiments are only partial embodiments of the present application, and not all of the embodiments, and all other embodiments obtained by those skilled in the art without creative efforts are within the scope of the present application.

At present, in order to realize a narrow frame of a display panel, a side binding technology is generally adopted, that is, a flip chip is bonded to a side of an array substrate. However, a thickness of a side section of each binding pin is small, only about 0.5 μm, an identification and reading accuracy of a side binding device are extremely high, which causes the binding difficulty to increase and binding efficiency is seriously degraded. In order to solve the above issues, a technical solution adopted by the present application is to provide a display panel to reduce difficulty of side binding and improve efficiency of the side binding.

Figure 1:
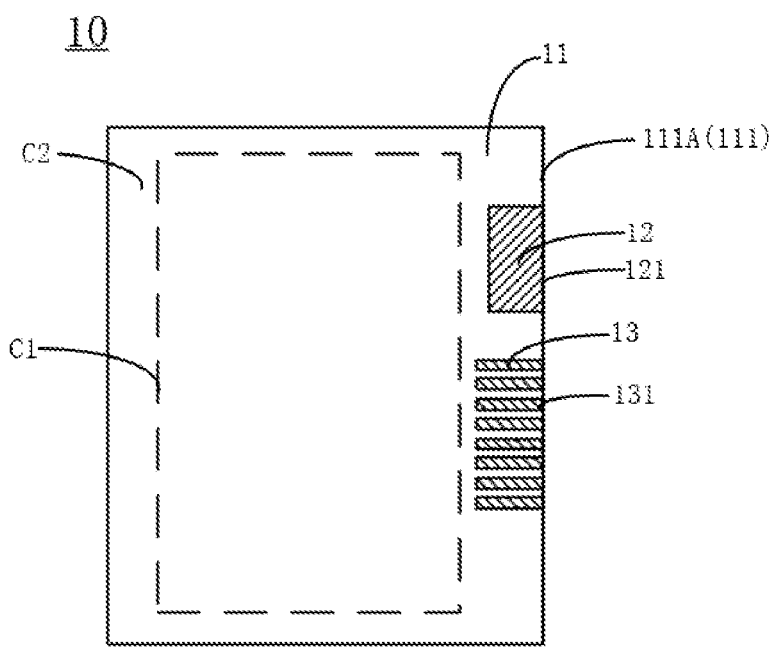
FIG. 1 is a schematic top plan view of a display panel according to an embodiment of the present application.
Figure 2:
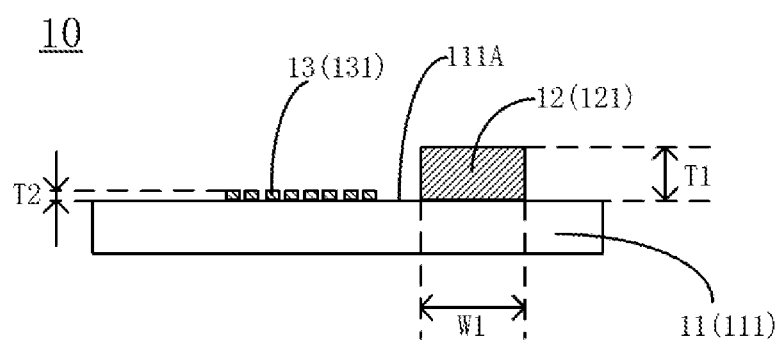
FIG. 2 is a side view showing a structure of the display panel of FIG. 1.

Referring to FIG. 1 and FIG. 2, FIG. 1 is a schematic top plan view of a display panel according to an embodiment of the present application, and FIG. 2 is a side view showing a structure of the display panel of FIG. 1. As shown in FIGS. 1 and 2, a display panel 10 includes a first substrate 11, and at least one binding alignment block 12 and a plurality of binding pins 13 on the first substrate 11. The first substrate 11 includes a display area C1 and a non-display area C2 disposed around the display area C1. An end of the binding pin 13 extends to an edge 111A of a binding side 111 of the first substrate 11, and is disposed on the non-display area C2. A side 121 of the binding alignment block 12 is disposed in a same plane as the binding side 111, and a thickness T1 of the binding alignment block 12 is greater than a thickness T2 of the binding pin 13.

The first substrate 11 may be a glass substrate or a rigid resin substrate, or may be a flexible substrate for preparing a flexible array substrate. Material of the binding pin 13 may be material having low resistivity such as aluminum, copper, or silver. Material of the binding alignment block 12 may be the same as or different from the material of the binding pin 13. The material of the binding alignment block 12 may be a conductive material such as aluminum, copper, or silver, or can also be an insulating material such as epoxy resin or acrolein-based resin.

Specifically, voltage and control signals required for image display of the display panel 10 are both from an external driving circuit (not shown), and a flip chip (not shown) is required between the display panel 10 and the driving circuit to achieve electrical connection. At present, the flip chip is usually bonded on a side of the display panel 10 to achieve electrical connection between the flip chip and the binding pin 13. Moreover, when the flip chip is electrically connected to the binding pin 13, a position of the binding pin 13 needs to be identified and read first. However, since the thickness T2 of the side section 131 of the binding pin 13 is small, it is difficult for a charge coupled device (CCD) image sensor of a binding device to quickly and accurately recognize and read the position of the binding pin 13, and thus difficulty of side binding increases, and binding efficiency decreases.

Therefore, an embodiment of the present application can provide the binding alignment block 12 on the non-display area C2 of the first substrate 11, and the thickness T1 of the binding alignment block 12 is greater than the thickness T2 of the binding pin 13. When a side bonding of the flip chip is performed, a position of the binding alignment block 12 is first recognized and read, and then a position of the binding pin 13 is indirectly determined according to the position of the binding alignment block 12. The thickness T1 of the binding alignment block 12 is large, so that the binding alignment block 12 is more easily recognized and read by the CCD image sensor than the binding pin 13, thereby reducing the difficulty of side binding and improving the efficiency of side binding.

It should be noted that, when the display panel 10 is manufactured, a relationship between a setting position of the binding pin 13 and a setting position of the binding alignment block 12 is pre-designed. In this way, after the CCD image sensor recognizes and reads the position of the binding alignment block 12, the position of the binding pin 13 can be determined according to the relationship between the positions of the binding pin 13 and the binding alignment block 12 to perform side binding of the above-mentioned flip chip.

In one embodiment, a ratio T1/T2 of the thickness of the binding alignment block 12 to the thickness of the binding pin 13 may be 5-20, for example, the thickness T2 of the binding pin 13 is 0.5 micrometer. The thickness T1 of the binding alignment block 12 may be 3 to 9 micrometers. The larger the thickness T1 of the binding alignment block 12 is, the more advantageous it is to reduce the difficulty of side binding of the flip chip, thereby improving efficiency of the side binding.

Further, this embodiment can also increase the width of the side 121 of the binding alignment block 12, so that the binding device can recognize and read the position of the binding alignment block 12 more accurately and quickly, for example, the contact width W1 of the binding alignment block 12 and the edge 111A of the binding side 111 may range from 100 to 300 microns.

Figure 3:
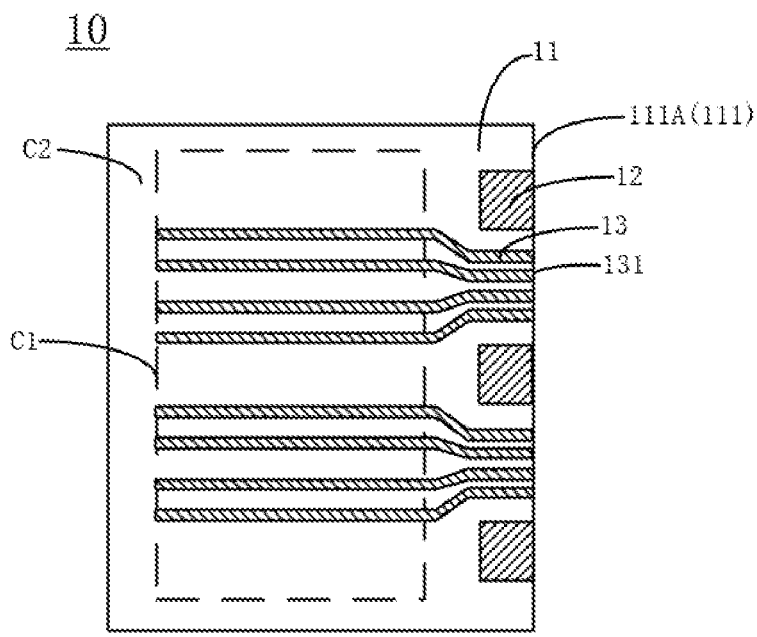
FIG. 3 is another schematic top plan view of a display panel according to an embodiment of the present application.

In some embodiments, as shown in FIG. 3, the binding alignment block 12 may be plural, and the plurality of binding alignment blocks 12 may be equally spaced along the edge 111A of the binding side 111. In this way, positioning the binding pin 13 through the plurality of binding alignment blocks 12 is more advantageous for improving the accuracy of the side binding.

Specifically, referring to FIG. 3, at least one binding pin 13 is disposed between two adjacent binding alignment blocks 12. Further, the binding pins 13 disposed between the adjacent two binding alignment blocks 12 may be grouped into one group, that is, the plurality of binding pins 13 may be divided into at least one binding pin group. Moreover, in a specific implementation, one end 131 of the binding pin 13 in each binding pin group may extend from the display area C1 to the edge 111A of the binding side 111, and the longer the extension distance, the smaller the interval between each other. In this way, the binding alignment blocks 12 that are closer to each other can be used to locate the corresponding binding pins 13 to improve the accuracy of the side binding.

Figure 4:
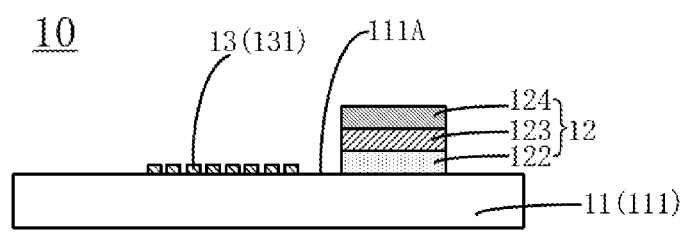
FIG. 4 is another schematic structural view of a display panel according to an embodiment of the present application.

In another embodiment, as shown in FIG. 4, the binding alignment block 12 may include a first primary color resist layer 122, a second primary color resist layer 123, and a third primary color resist layer 124 sequentially away from the first substrate 11. For example, the first primary color resist layer 122 may be a red color resist layer, the second primary color resist layer 123 may be a green color resist layer, and the third primary color resist layer 124 may be a blue color resist layer. Side widths of the first primary color resist layer 122, the second primary color resist layer 123, and the third primary color resist layer 124 may all be the same, partially the same, or all different. Moreover, in some alternative embodiments, the binding alignment block 12 may further include only one or two layers of the first primary color resist layer 122, the second primary color resist layer 123, and the third primary color resist layer 124.

Figure 5:
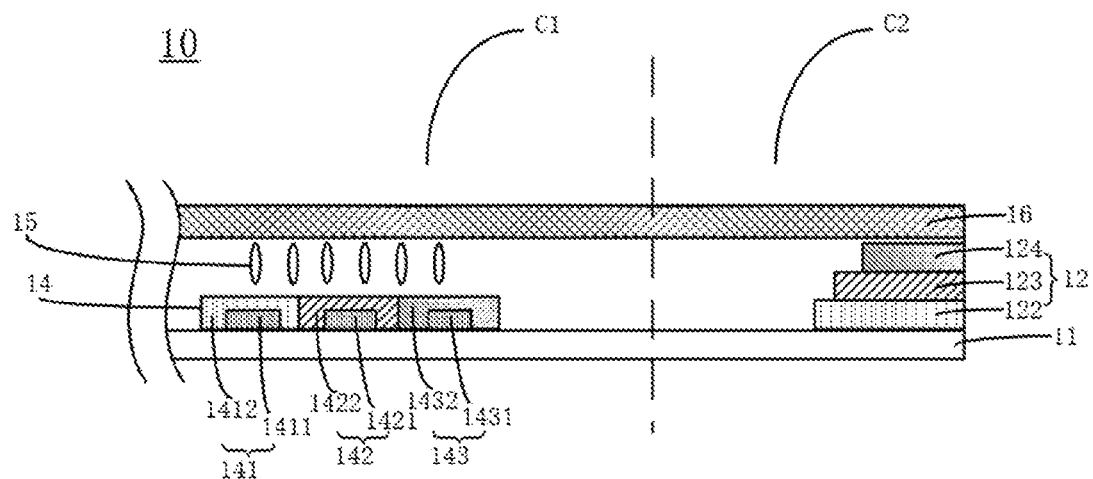
FIG. 5 is another schematic structural view of a display panel according to an embodiment of the present application.

In a specific embodiment, as shown in FIG. 5, the display panel 10 may further include a plurality of pixels 14 disposed on the display area C1. Each of the pixels 14 includes a first primary color sub-pixel 141, a second primary color sub-pixel 142, and a third primary color sub-pixel 143. The first primary color sub-pixel 141 includes a first thin film transistor 1411 and a first primary color sub-pixel color resist layer 1412 which are sequentially disposed on the first substrate 11. The second sub-pixel 142 includes a second thin film transistor 1421 and a second primary color sub-pixel color resist layer 1422 which are sequentially disposed on the first substrate 11. The third sub-pixel 143 includes a third thin film transistor 1431 and a third primary color sub-pixel color resist layer 1432 which are sequentially disposed on the first substrate 11. Moreover, in a specific implementation, the first primary color sub-pixel color resist layer 1412 of the first primary color sub-pixel 141 and the first primary color resist layer 122 of the binding alignment block 12 may be formed by the same patterning process. The second primary color sub-pixel color resist layer 1422 of the second primary color sub-pixel 142 and the second primary color resist layer 123 of the binding alignment block 12 may be formed by the same patterning process. The third primary color sub-pixel color resist layer 1432 of the third primary color sub-pixel 143 and the third primary color resist layer 124 of the binding alignment block 12 may be formed by the same patterning process.

Specifically, referring to FIG. 5, the display panel 10 may further include a black matrix (not shown) located between the primary color sub-pixel color resist layers of two adjacent primary color sub-pixels for preventing light leakage or color mixing.

In some alternative embodiments, the material of the binding alignment block 12 may also be the same as the material of the black matrix described above. That is, it may be a black shading material. Moreover, in a specific implementation, the binding alignment block 12 and the black matrix may be formed by the same patterning process. That is, the binding alignment block 12 is formed on the non-display area C2 while forming a black matrix between the primary color sub-pixel color resist layers of the adjacent two primary color sub-pixels.

In other alternative embodiments, when a thin film transistor is prepared by a mask exposure development process, an exposure region to which the alignment block 12 is bonded may be added to the mask to prepare a binding alignment block 12 while preparing the thin film transistor.

Further, with continued reference to FIG. 5, the display panel 10 may further include a liquid crystal layer 15 and a second substrate 16. The liquid crystal layer 15 is located on the first substrate 11 on which the binding pins 13 and the binding alignment blocks 12 are formed, and the second substrate 16 is located on the liquid crystal layer 15. The second substrate 16 may be a transparent substrate, and the material thereof may be a transparent material such as glass or plastic.

Beneficial effects of an embodiment of the present application are that, the present application is different from the prior art. The display panel provided by an embodiment of the present application includes a first substrate, and at least one binding alignment block and a plurality of binding pins on the first substrate. The first substrate includes a display area and a non-display area disposed around the display area, an end of each of the binding pins extends to an edge of a binding side of the first substrate and is disposed on the non-display area, a side of the binding alignment block is in a same plane as the binding side of the first substrate, and a thickness of the binding alignment block is greater than a thickness of each of the binding pins, so that when a side binding is performed, a side section of each binding pin can be positioned and bound by the at least one binding alignment block. The thickness of the at least one binding alignment block is larger, and is more easily recognized and read by a binding device, thereby reducing difficulty of side binding and improving efficiency of the side binding.

Please refer to FIG. 6. FIG. 6 is a schematic flowchart of a method of manufacturing a display panel according to an embodiment of the present application. The specific process of the display panel can be as follows:

S61: providing a first substrate comprising a display area and a non-display area disposed around the display area is provided.

The first substrate may be a glass substrate or a rigid resin substrate, or may be a flexible substrate for preparing a flexible array substrate.

S62: forming a plurality of binding pins on the first substrate, and forming at least one binding alignment block on the non-display area are provided. An end of each of the binding pins extends to an edge of a binding side of the first substrate and is disposed on the non-display area, a side of the at least one binding alignment block is in a same plane as the binding side of the first substrate, and a thickness of the at least one binding alignment block is greater than a thickness of each of the binding pins.

Material of the binding pin may be material having low resistivity such as aluminum, copper, or silver. Material of the binding alignment block may be the same as or different from the material of the binding pin 13. The material of the binding alignment block may be a conductive material such as aluminum, copper, or silver, or can also be an insulating material such as epoxy resin or acrolein-based resin.

Specifically, voltage and control signals required for image display of the display panel are both from an external driving circuit (not shown), and a flip chip (not shown) is required between the display panel and the driving circuit to achieve electrical connection. At present, the flip chip is usually bonded on a side of the display panel to achieve electrical connection between the flip chip and the binding pin. Moreover, when the flip chip is electrically connected to the binding pin, a position of the binding pin needs to be identified and read first. However, since the thickness of the side section of the binding pin is small, it is difficult for a charge coupled device (CCD) image sensor of a binding device to quickly and accurately recognize and read the position of the binding pin, and thus difficulty of side binding increases, and binding efficiency decreases.

Therefore, an embodiment of the present application can provide the binding alignment block on the non-display area of the first substrate, and the thickness of the binding alignment block is greater than the thickness of the binding pin. When a side bonding of the flip chip is performed, a position of the binding alignment block is first recognized and read, and then a position of the binding pin is indirectly determined according to the position of the binding alignment block. The thickness of the binding alignment block is large, so that the binding alignment block is more easily recognized and read by the CCD image sensor than the binding pin, thereby reducing the difficulty of side binding and improving the efficiency of side binding.

It should be noted that, when the display panel is manufactured, a relationship between a setting position of the binding pin and a setting position of the binding alignment block is pre-designed. In this way, after the CCD image sensor recognizes and reads the position of the binding alignment block, the position of the binding pin can be determined according to the relationship between the positions of the binding pin and the binding alignment block to perform side binding of the above-mentioned flip chip.

In one embodiment, a ratio of the thickness of the binding alignment block to the thickness of the binding pin may be 5-20, for example, the thickness of the binding pin is 0.5 micrometer. The thickness of the binding alignment block may be 3 to 9 micrometers. The larger the thickness of the binding alignment block is, the more advantageous it is to reduce the difficulty of side binding of the flip chip, thereby improving efficiency of the side binding.

Further, this embodiment can also increase the width of the side of the binding alignment block, so that the binding device can recognize and read the position of the binding alignment block more accurately and quickly, for example, the contact width of the binding alignment block and the edge of the binding side may range from 100 to 300 microns.

In some embodiments, the binding alignment block may be plural, and the plurality of binding alignment blocks may be equally spaced along the edge of the binding side. In this way, positioning the binding pin through the plurality of binding alignment blocks is more advantageous for improving the accuracy of the side binding.

In a specific embodiment, the binding alignment block may include a first primary color resist layer, a second primary color resist layer, and a third primary color resist layer, which are sequentially away from the first substrate. The S62 may specifically include:

S621: forming a plurality of binding pins on the first substrate is provided.

Specifically, the display panel may further include a thin film transistor disposed on the display area. The binding pin can be fabricated simultaneously with a source and a drain of the thin film transistor. That is, the above S621 can specifically include: forming a plurality of binding pins on the first substrate, and fabricating the source and the drain of the thin film transistor on the display area.

S622: forming a first primary color resist layer on the non-display area using a first mask is provided.

In one embodiment, the display panel may further include a primary color sub-pixel color resist layer disposed on the thin film transistor. The primary color sub-pixel color resist layer may include a first primary color sub-pixel color resist layer, a second primary color sub-pixel color resist layer, and a third primary color sub-pixel color resist layer disposed at intervals. Specifically, the foregoing S622 may specifically include as follows.

A first primary color resist layer is formed on the non-display area by using the first mask, and a first primary color sub-pixel color resist layer is formed on the thin film transistor.

S623: forming a second primary color resist layer on the first primary color resist layer using a second mask is provided.

Following the previous embodiment, S623 may specifically include as follows.

A second primary color resist layer is formed on the first primary color resist layer using the second mask, and a second primary color sub-pixel resist layer is formed on the thin film transistor.

S624: forming a third primary color resist layer on the second primary color resist layer using a third mask is provided.

Following the previous embodiment, S624 may specifically include as follows.

A third primary color resist layer is formed on the second primary color resist layer using the third mask, and a third primary color sub-pixel resist layer is formed on the thin film transistor.

In some alternative embodiments, the material of the binding alignment block may also be a black shading material. For example, the display panel may further include a black matrix between adjacent two primary color sub-pixel color resist layers for preventing light leakage or color mixing. The binding alignment block and the above black matrix can be formed by the same patterning process.

In other alternative embodiments, when a thin film transistor is prepared using a mask exposure development process, an exposure region of the binding alignment block may be added on the mask to prepare the binding alignment block while preparing the thin film transistor.

Beneficial effects of an embodiment of the present application are that, the present application is different from the prior art. The method of manufacturing the display panel provided by an embodiment of the present application includes providing a first substrate including a display area and a non-display area disposed around the display area, forming a plurality of binding pins on the first substrate, and forming at least one binding alignment block and on the non-display area. An end of each of the binding pins extends to an edge of a binding side of the first substrate and is disposed on the non-display area, a side of the binding alignment block is in a same plane as the binding side of the first substrate, and a thickness of the binding alignment block is greater than a thickness of each of the binding pins, so that when a side binding is performed, a side section of each binding pin can be positioned and bound by the at least one binding alignment block. The thickness of the at least one binding alignment block is larger, and is more easily recognized and read by a binding device, thereby reducing difficulty of side binding and improving efficiency of the side binding.

Refer to FIG. 7, FIG. 7 is a schematic structural view of a display device according to an embodiment of the present application. The display device 70 includes a flip chip 71, a drive circuit 72, and a display panel 73 of any of the above embodiments. The display panel 73 includes a first substrate, and at least one binding alignment block and a plurality of binding pins on the first substrate. The first substrate includes a display area and a non-display area disposed around the display area. An end of the binding pin extends to an edge of a binding side of the first substrate, and is disposed on the non-display area. A side of the binding alignment block is disposed in a same plane as the binding side, and a thickness of the binding alignment block is greater than a thickness of the binding pin. Specifically, the flip chip 71 is disposed on the bonding side 731 of the display panel 73, and is electrically connected to an end of the binding pin, and the driving circuit 72 is electrically connected to the flip chip 71.

Beneficial effects of an embodiment of the present application are that, the present application is different from the prior art. The display device provided by an embodiment of the present application includes a first substrate, and at least one binding alignment block and a plurality of binding pins on the first substrate. The first substrate includes a display area and a non-display area disposed around the display area, an end of each of the binding pins extends to an edge of a binding side of the first substrate and is disposed on the non-display area, a side of the binding alignment block is in a same plane as the binding side of the first substrate, and a thickness of the binding alignment block is greater than a thickness of each of the binding pins, so that when a side binding is performed, a side section of each binding pin can be positioned and bound by the at least one binding alignment block. The thickness of the at least one binding alignment block is larger, and is more easily recognized and read by a binding device, thereby reducing difficulty of side binding and improving efficiency of the side binding.

In the above, the present invention has been disclosed in the above preferred embodiments, but the preferred embodiments are not intended to limit the present application. Any modifications, equivalent substitutions, and improvements made within the spirit and principles of the present invention should be included in the scope of the present invention.

What is claimed is:

1. A display panel, comprising:
a first substrate comprising a display area and a non-display area disposed around the display area;
a plurality of binding pins disposed on the first substrate, wherein an end of each of the binding pins extends to an edge of a binding side of the first substrate and is disposed on the non-display area; and
at least one binding alignment block disposed on the non-display area, wherein a side of the at least one binding alignment block is in a same plane as the binding side of the first substrate, and a thickness of the at least one binding alignment block is greater than a thickness of each of the binding pins;
wherein one end of each binding pin in each binding pin group extends from the display area to the edge of the binding side, and the longer the extension distance of the binding pins in each binding pin group, the smaller the interval between the binding pins in each binding pin group.

2. The display panel according to claim 1, wherein a ratio of the thickness of the at least one binding alignment block to the thickness of each of the binding pins ranges from 5 to 20.

3. The display panel according to claim 1, wherein a contact width of the at least one binding alignment block and the edge of the binding side of the first substrate ranges from 100 to 300 micrometers.

4. The display panel according to claim 1, wherein the at least one binding alignment block is equally spaced along the edge of the binding side of the first substrate.

5. The display panel according to claim 4, wherein at least one of the binding pins is disposed between two adjacent binding alignment blocks.

6. The display panel according to claim 1, wherein the at least one binding alignment block comprises a first primary color resist layer, a second primary color resist layer, and a third primary color resist layer sequentially away from the first substrate.

7. The display panel according to claim 1, wherein material of the at least one binding alignment block comprises a black shading material.

8. The display panel according to claim 1, further comprising a liquid crystal layer and a second substrate, wherein the liquid crystal layer is disposed on the first substrate on which the binding pins and the at least one binding alignment block are disposed, and the second substrate is disposed on the liquid crystal layer.

9. A method of manufacturing a display panel, comprising:
   providing a first substrate comprising a display area and a non-display area disposed around the display area;
   forming a plurality of binding pins on the first substrate and forming at least one binding alignment block on the non-display area, wherein an end of each of the binding pins extends to an edge of a binding side of the first substrate and is disposed on the non-display area, a side of the at least one binding alignment block is in a same plane as the binding side of the first substrate, and a thickness of the at least one binding alignment block is greater than a thickness of each of the binding pins;
   wherein one end of each binding pin in each binding pin group extends from the display area to the edge of the binding side, and the longer the extension distance of the binding pins in each binding pin group, the smaller the interval between the binding pins in each binding pin group.

10. The method according to claim 9, wherein the at least one binding alignment block comprises a first primary color resist layer, a second primary color resist layer, and a third primary color resist layer sequentially away from the first substrate, and forming the at least one binding alignment block on the non-display area comprises:
   forming the first primary color resist layer on the non-display area using a first mask;
   forming the second primary color resist layer on the first primary color resist layer using a second mask; and
   forming the third primary color resist layer on the second primary color resist layer using a third mask.

* * * * *